United States Patent
Woehrle et al.

(10) Patent No.: US 9,806,325 B2
(45) Date of Patent: Oct. 31, 2017

(54) BATTERY HOUSING FOR LITHIUM-ION CELLS

(75) Inventors: Thomas Woehrle, Stuttgart-Feuerbach (DE); Stephan Leuthner, Leonberg (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 410 days.

(21) Appl. No.: 14/115,641

(22) PCT Filed: Apr. 16, 2012

(86) PCT No.: PCT/EP2012/056864
§ 371 (c)(1),
(2), (4) Date: Feb. 7, 2014

(87) PCT Pub. No.: WO2012/150117
PCT Pub. Date: Nov. 8, 2012

(65) Prior Publication Data
US 2014/0170447 A1 Jun. 19, 2014

(30) Foreign Application Priority Data
May 5, 2011 (DE) .................. 10 2011 075 318

(51) Int. Cl.
*H01M 2/36* (2006.01)
*A62C 3/07* (2006.01)
(Continued)

(52) U.S. Cl.
CPC .............. *H01M 2/362* (2013.01); *A62C 3/07* (2013.01); *A62C 3/16* (2013.01); *A62D 1/0007* (2013.01);
(Continued)

(58) Field of Classification Search
CPC .... H01M 2/362; H01M 2/12; H01M 2200/00; H01M 2/1235; H01M 2/1241;
(Continued)

(56) References Cited

U.S. PATENT DOCUMENTS

| | | | | |
|---|---|---|---|---|
| 2,837,891 A | * | 6/1958 | Stasiak | A62D 1/0057 149/1 |
| 5,449,571 A | * | 9/1995 | Longardner | H01M 2/0237 429/120 |

(Continued)

FOREIGN PATENT DOCUMENTS

| | | |
|---|---|---|
| CN | 1996640 A | 7/2007 |
| CN | 101682186 A | 3/2010 |

(Continued)

OTHER PUBLICATIONS

Sheng Shui Zhang. "A review on electrolyte additives for lithium-ion batteries". Journal of Power Sources: (162) 2006. pp. 1379-1394.*

(Continued)

*Primary Examiner* — James Lee
(74) *Attorney, Agent, or Firm* — Maginot, Moore & Beck LLP

(57) ABSTRACT

A battery housing includes an inner chamber configured to accommodate galvanic cells, in particular lithium-ion cells, which are provided with a cut-out area that can be opened in the event of failure of the cell. In order to prevent, retard and optionally at least partially extinguish a fire in the event of the failure of one or more cells, for example during an accident of an electrically operated vehicle, the inner chamber of the battery housing includes at least one dispenser for dispensing a flame-inhibiting, flame-retarding and/or flame-extinguishing agent. The dispenser has at least one dispenser opening arranged adjacent to a cut-out area of a cell and configured to be opened. The dispenser opening is config- (Continued)

ured to be opened during a mechanical shock and/or a temperature increase and/or a pressure increase above a predetermined limit value.

15 Claims, 1 Drawing Sheet

(51) Int. Cl.
| | |
|---|---|
| A62C 3/16 | (2006.01) |
| A62D 1/00 | (2006.01) |
| A62D 1/02 | (2006.01) |
| H01M 2/12 | (2006.01) |
| H01M 10/42 | (2006.01) |
| H01M 2/10 | (2006.01) |

(52) U.S. Cl.
CPC ......... *A62D 1/0028* (2013.01); *A62D 1/0071* (2013.01); *H01M 2/1247* (2013.01); *H01M 10/4207* (2013.01); *H01M 2/1016* (2013.01); *H01M 2200/00* (2013.01); *H01M 2200/10* (2013.01); *H01M 2200/20* (2013.01)

(58) Field of Classification Search
CPC .. H01M 2/1247; H01M 2/127; H01M 2/1282; A62C 3/00; A62D 1/00
USPC ..................................................... 429/61–64
See application file for complete search history.

(56) References Cited

U.S. PATENT DOCUMENTS

2003/0077485 A1* 4/2003 Streuer ............... H01M 2/1072
429/7
2011/0005781 A1* 1/2011 Yasui .................... B60L 3/0046
169/54
2011/0104523 A1* 5/2011 Lee ....................... H01M 2/027
429/7

FOREIGN PATENT DOCUMENTS

| DE | 40 12 549 A1 | 10/1991 |
|---|---|---|
| DE | 102 57 191 B3 | 8/2004 |
| DE | 10 2008 059 948 A1 | 6/2010 |
| EP | 1 806 807 A1 | 7/2007 |
| EP | 2 104 159 A1 | 9/2009 |
| EP | 2 159 894 A1 | 3/2010 |
| JP | 9-74603 A | 3/1997 |
| JP | 11-214037 A | 8/1999 |
| JP | 2004-319101 A | 11/2004 |
| JP | 2005-332700 A | 12/2005 |
| JP | 2007-252731 A | 10/2007 |
| JP | 2008-251263 A | 10/2008 |
| JP | 2010-97836 A | 4/2010 |
| JP | 2010-192430 A | 9/2010 |
| JP | 2010-282906 A | 12/2010 |
| JP | 2011-72669 A | 4/2011 |

OTHER PUBLICATIONS

Yasui et al. JP 2010-97836. Apr. 30, 2010. English machine translation by JPO.*
Yasui et al. JP 2010-97836. Apr. 30, 2010. English machine translation by EPO.*
Tamezane et al. JP 2008-251263. Oct. 16, 2008. English Machine translation by EPO.*
International Search Report corresponding to PCT Application No. PCT/EP2012/056864, dated Jul. 19, 2012 (German and English language document) (7 pages).

* cited by examiner

BATTERY HOUSING FOR LITHIUM-ION CELLS

This application is a 35 U.S.C. §371 National Stage Application of PCT/EP2012/056864, filed on Apr. 16, 2012, which claims the benefit of priority to Serial No. DE 10 2011 075 318.4, filed on May 5, 2011 in Germany, the disclosures of which are incorporated herein by reference in their entirety.

The present disclosure relates to a battery housing, in particular for lithium-ion cells, a galvanic cell and a battery.

BACKGROUND

Lithium-ion cells have a positive electrode, referred to as the cathode, and a negative electrode, referred to as the anode, onto which the lithium-ions are reversible deposited and removed again, which is also referred to as intercalation or de-intercalation. A specific packaging form of lithium-ion cells is referred to as lithium-ion polymer cells or lithium-polymer cell. This is understood to mean lithium-ion cells which are packed in an aluminum composite foil, which in the technical technology is also referred to as a pouch or soft pack.

So that the intercalation or de-intercalation takes place, lithium-ion cells contain an electrolyte. In practice, in all contemporary lithium-ion cells, both in the field of small appliances, for example in the case of cell phones, MP3 players or accumulator-operated tools, as well as in the field of automobiles, for example in the case of hybrid cars (HEV; hybrid electric vehicle), plug-in-hybrid cars (PHEV; plug-in electric vehicle) and electric cars (EV; electric vehicle), these electrolytes are currently composed of the conducting salt lithium hexafluorophosphate ($LiPF_6$) which is dissolved in an organic solvent. Organic carbonates, such as ethylene carbonate (EC) and/or dimethyl carbonate (DMC), are usually used as the solvent. These organic solvent components in the electrolyte are, however, combustible. In addition, in particular volatile solvents can also ignite with air or oxygen or even form explosive mixtures.

For example, in the case of overloading, damage to the cell packaging or unintentional internal or external short-circuiting, lithium-ion cells can heat up to a greater or lesser extent and gaseous, liquid or aerosol cell components can be released when the cell packaging is opened. The cell component in this context can either be non-decomposed combustible cell components, for example electrolytic solvents as well as combustible decomposition products such as carbon monoxide (CO), hydrogen ($H_2$) or methane ($CH_4$).

Document DE 10 2008 059 948 A1 describes a method and a device for preventing and/or fighting fires for a lithium-ion battery in which an extinguishing agent can be temporarily introduced into the interior of the battery via an emergency line from an extinguishing agent accumulator arranged outside the battery housing.

SUMMARY

The subject matter of the present disclosure is a battery housing having an interior space for accommodating galvanic cells, in particular lithium-ion cells, which are provided with at least one cut-out area which can be opened in the event of failure of the cell.

According to the disclosure, the interior of the battery housing has at least one dispenser for dispensing of a flame-inhibiting, flame-retarding and/or flame-extinguishing, in particular flame-inhibiting and/or flame-retarding, agent which has at least one dispenser opening which can be arranged or is arranged adjacent to a cut-out area of a cell and can be opened, wherein the dispenser opening can be opened in the event of a mechanical shock and/or an increase in temperature and/or a pressure increase above a predetermined limiting value.

The dispenser can therefore advantageously open in the event of a hazard which is conventionally associated with a mechanical shock, an increase in temperature and/or a pressure increase, and the flame-inhibiting, flame-retarding and/or flame-extinguishing agents are released. Surprisingly, even small quantities of the flame-inhibiting, flame-retarding and/or flame-extinguishing agents can prevent deflagration and fires which are a source of danger, in particular, in the case of mechanical damage to the battery housing or in the case of internal short circuits as a result of combustible fluids or gases escaping. It is therefore advantageously possible for a fire to be prevented, retarded or, if appropriate, at least partially extinguished, in the event of a failure of one or more cells, for example in the case of an accident of an electrically driven vehicle. By virtue of the fact that the flame-inhibiting, flame-retarding and/or flame-extinguishing agent is used directly after the occurrence of a danger, flames and fire can be particularly effectively prevented. In addition, owing to early activation a significantly smaller quantity of the flame-inhibiting, flame-retarding and/or flame-extinguishing agent is necessary, for which reason it can be made available without taking additional space within the so-called "dead" volume which is otherwise usually available in the battery housing. By virtue of the fact that the flame-inhibiting, flame-retarding and/or flame-extinguishing agent is released only when necessary, the battery housing components and cell components can be protected against chemical long-term interaction with the flame-inhibiting, flame-retarding and/or flame-extinguishing agent. By virtue of the fact that the flame-inhibiting, flame-retarding and/or flame-extinguishing agent is not added to the electrolyte, it is also possible to use relatively large quantities which therefore cannot have an adverse effect, for example on the electrical conductivity and service life of the cell, as would be the case in the electrolyte or inside the cells. Overall, an effective, space-saving and cost-effective solution for preventing, retarding and/or combating fires is therefore advantageously made available and the safety of people and the environment is improved.

A mechanical shock may be understood to mean, for example, an, in particular abrupt, change in the state variable which triggers a force, for example acceleration or, for example, the impetus. For example, a mechanical shock can occur in the case of a rear-end accident of a vehicle. The change within a time interval is often assessed, for example in the case of a crash during the triggering of an airbag.

The dispenser opening may be capable of being opened, for example, in the event of a mechanical shock of more than 20 g, for example of more than 40 g, and/or of an increase in temperature to more than 80° C. and/or a pressure increase to more than 2 bar.

A galvanic cell may have, in particular, at least one cut-out area. In this context it is possible for a galvanic cell to have a plurality of cut-out areas.

A cut-out area may be embodied, for example, as a predetermined break point, which breaks or opens the cell when certain conditions occur, for example when a cell internal pressure, of for example 8 bar, is exceeded.

Within the scope of one embodiment, the dispenser is configured to dispense a liquid, a foam or a solid, in particular a liquid. Storing liquids, foams and solids, in particular liquids and solids, involves significantly lower maintenance costs compared to the storage of gases since, compared to gases which diffuse away, the storage of liquids and solids can be ensured significantly more easily.

Within the scope of a further embodiment, the dispenser opening is embodied in the form of a thinning of the wall or a joint seam, for example, a weld seam, flow line or joint, is formed in the wall of the dispenser. This provides a very simple and cost-effective configuration possibility for a dispenser which can be opened by means of a mechanical shock, increase in temperature and/or pressure increase.

Within the scope of a further embodiment, the dispenser is formed, at least in the region of the dispenser opening, partially or completely from an organic, for example polymer and/or wax-like, material with a melting point in a range from $\geq 80°$ C. to $\leq 200°$ C., in particular from $\geq 90°$ C. to $\leq 150°$ C., for example from $\geq 95°$ C. to $\leq 125°$ C. It is therefore easily possible to implement a dispenser which can be opened by means of an increase in temperature.

Within the scope of a further embodiment, the dispenser is formed, at least in the region of the dispenser opening, partially or completely from plastic. In particular, the dispenser can be formed, at least in the region of the dispenser opening, partially or completely from a thermoplast. For example, the dispenser can be formed, at least around the region of the dispenser opening, partially or completely from a polyolefin, for example polyethylene (PE) and/or polypropylene (PP). Plastics can be shaped easily and cost-effectively. In addition, plastics have a low weight. In the case of polyolefins, the material costs are also particularly low. Polyolefins are additionally advantageously resistant to a large number of chemicals, in particular organic solvents.

Within the scope of a further embodiment, the dispenser opening has an opening mechanism, for example a valve, by means of which the dispenser opening can be opened automatically. The opening mechanism is preferably configured in such a way that it can be opened automatically on the basis of crash sensor data, for example of an acceleration sensor, of the vehicle,—similarly to an airbag—when an accident of a vehicle comprising the battery housing is detected. When the battery housing is used in the field of automobiles, the opening of the opening mechanism of the dispenser can advantageously be brought about by means of the same control device and the same sensors of the vehicle as the opening of airbags.

Within the scope of a further embodiment, the dispenser is a blow-molded body. Plastics can be blow-molded particularly easily and cost-effectively. In addition, it is advantageously possible to form such bodies from glass. Glass advantageously has a high degree of shock sensitivity. In addition, glass can have a high pressure sensitivity. In addition, glass is advantageously cost-effective and resistant to a large number of chemicals.

Within the scope of a further embodiment, the dispenser is thus formed partially or completely from a glass, at least in the region of the dispenser opening. However, in order to adjust the shock sensitivity and pressure sensitivity to the desired value, the other regions of the dispenser wall can advantageously be formed from another less shock-sensitive and pressure-sensitive material.

Within the scope of a further embodiment, the dispenser has a plurality of dispenser openings. It is therefore possible, when necessary, to provide a plurality of cells and/or a plurality of cut-out areas with the flame-inhibiting, flame-retarding and/or flame-extinguishing agent. In addition, this also provides the possibility, in the event of only one cell or only a few cells assigned to the dispenser failing, of providing the few cells with the entire quantity of flame-inhibiting, flame-retarding and/or flame-extinguishing agent stored in the dispenser, and thereby particularly effectively preventing these cells catching fire, and, under certain circumstances, at least partially combating a fire.

Within the scope of a further embodiment, the cells have the cut-out area or areas on each of their cell upper sides. In this configuration, preferably at least one of the dispenser openings can be arranged or is arranged over the cells, in particular over the cut-out areas. Such a configuration is particularly effective for inhibiting, retarding and combating flames with a liquid or a solid.

Galvanic cells are usually connected to form modules. The connection can be either parallel or serial here. A plurality of modules can in turn be connected to form what is referred to as a pack or system. In this context, batteries can be understood to refer both to individual modules as well as packs or systems composed of a plurality of modules.

Galvanic cells may, for example, be connected to form modules composed of at least two, in particular at least four or six or eight, cells. In this context, each cell can have one or more cut-out areas.

Within the scope of a further embodiment, the number of dispenser openings of a dispenser corresponds to the number of cells, preferably of cut-out areas, of a module composed of a plurality of connected galvanic cells. It is therefore possible advantageously to improve the safety of a module by means of a simple and space-saving configuration.

Within the scope of a further embodiment, the dispenser can be arranged or is arranged between the poles of a galvanic cell or of a module composed of a plurality of galvanic cells. The region between the poles has hitherto constituted a so-called "dead", that is to say unused, volume. Configuring the dispenser for use in this region is therefore particularly advantageous in terms of optimum utilization of space. In this context, the dispenser preferably does not take up any additional space apart from the space available between the poles of the cell or cells.

Within the scope of a further embodiment, the flame-inhibiting, flame-retarding and/or flame-extinguishing agent comprises at least one radical catcher, for example a halogenated or non-halogenated organic compound, in particular based on phosphorus, for example which is selected from the group composed of alkylphosphates and/or arylphosphates such as tris(2,2,2-trifluoroethyl)phosphate, trimethyl-phosphate, triethylphosphate, cyclic phosphates, for example cyclophosphacenes such as hexamethoxycyclotriphosphacenes, phosphites such as tris(2,2,2-trifluoroethyl)phosphite, fluorinated alkylene carbonates such as fluorinated propylene carbonate, fluorinated ethers such as methylnonafluorobutylether, and combinations thereof.

Such flame-inhibiting or flame-retarding radical catchers are described, for example, by Zhang et al. in Journal of Power Sources, 2006, 162, 1379-1394 as an electrolytic additive for lithium-ion batteries as well as the literature cited therein. Particularly good results have been obtained with fluorinated species such as tris(2,2,2-trifluoroethyl) phosphate.

Within the scope of a further embodiment, the flame-inhibiting, flame-retarding and/or flame-extinguishing agent comprises at least one alkaline earth compound, in particular calcium compound. Alkaline earth ions, in particular, calcium ions, can advantageously bind hydrogen fluoride which occurs, under certain circumstances, in the form of alkaline earth fluorides, which are difficult to dissolve, for example calcium fluoride. It is therefore advantageously possible to improve further the safety of people and of the environment.

In addition, the flame-inhibiting, flame-retarding and/or flame-extinguishing agent can contain water. For example, the flame-inhibiting, flame-retarding and/or flame-extinguishing agent may comprise or be an aqueous, alkaline earth-containing, in particular calcium-containing, solution.

Furthermore, the battery housing can also have, in particular, electrical lines, for example for connecting together cells and/or modules, and for connection to a cell monitoring device. In the case of a cell monitoring device, the latter is also preferably integrated into the battery housing. In order to connect the battery housing to a consumer and/or to connect a plurality of battery housings together, the battery housing also preferably comprises one or more plugs, for example high-voltage plugs. Furthermore, the battery housing can have coolant line connections and coolant lines for cooling the galvanic cells. Furthermore, the battery housing can comprise one or more securing devices for mounting the battery housing in a system, for example in a vehicle or a fixed energy supply system.

With respect to further advantages and features, reference is made here specifically to the explanations relating to the dispenser according to the disclosure, the galvanic cell according to the disclosure, the battery according to the disclosure and the figures.

A further subject matter of the present disclosure is a dispenser for dispensing a flame-inhibiting, flame-retarding and/or flame-extinguishing, in particular liquid, solid or foam agent, for inhibiting, retarding and/or extinguishing fires in one or more lithium-ion cells, the upper side or sides of which is/are provided with at least one cut-out area which can be opened in the event of failure of the cell, wherein the dispenser has at least one dispenser opening which can be arranged adjacent to the cut-out area of a cell and can be opened, wherein the dispenser opening can be opened in the event of a mechanical shock and/or an increase in temperature and/or a pressure increase above a predetermined limiting value, in particular wherein the dispenser can be arranged between the poles of a galvanic cell or a module composed of a plurality of galvanic cells, without at the same time taking up additional space apart from the space available between the poles of the cell or cells.

With respect to further advantages and features, reference is made here explicitly to the explanations relating to the battery housing according to the disclosure, the galvanic cell according to the disclosure, the battery according to the disclosure and to the figures.

A further subject matter of the present disclosure is a galvanic cell, in particular lithium-ion cell, wherein the cell has, on the upper side of the cell, at least one cut-out area which can be opened in the event of failure of the cell, wherein the cut-out area is formed in a section which is countersunk with respect to the main surface of the upper side of the cell. A galvanic cell which is configured in such a way is particularly well suited for the concept according to the disclosure since a flame-inhibiting, flame-retarding and/or flame-extinguishing, in particular liquid, solid or foam agent, which is output from a dispenser arranged over the cut-out area, can collect in the depression and thereby particularly well prevent, retard or even combat a fire.

With respect to further advantages and features, reference is herewith made explicitly to the explanations relating to the battery housing according to the disclosure, the dispenser according to the disclosure, the battery according to the disclosure and the figures.

A further subject matter of the present disclosure is a battery, in particular a lithium-ion battery, which comprises a battery housing according to the disclosure and/or a dispenser according to the disclosure and/or a galvanic cell according to the disclosure. In this context, at least one dispenser opening is preferably arranged over the cells, particularly preferably over the cut-out areas, in particular wherein the number of dispenser openings corresponds to the number of cells, particularly preferably of the cut-out areas.

With respect to further advantages and features, reference is herewith made explicitly to the explanations relating to the battery housing according to the disclosure, the dispenser according to the disclosure, the galvanic cell according to the disclosure and the figures.

BRIEF DESCRIPTION OF THE DRAWINGS

Further advantages and advantageous refinements of the subject matters according to the disclosure are illustrated by the drawings and explained in the following description. It is to be noted here that the drawings only have a descriptive character and are not intended to limit the disclosure in any way. In the drawings.

DETAILED DESCRIPTION

Figure 1:
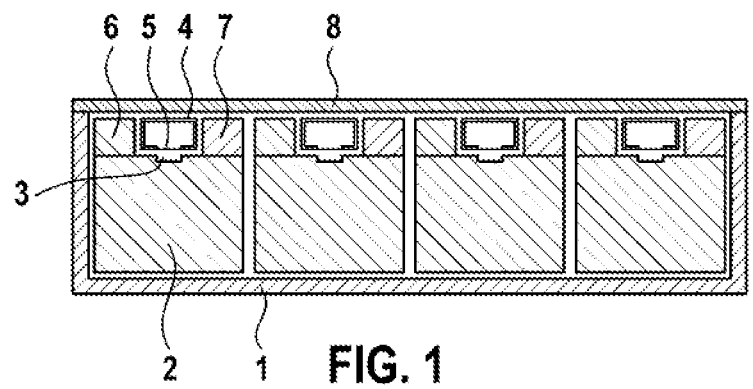
FIG. 1 shows a schematic cross section through an embodiment of a battery according to the disclosure, parallel to the side faces of the galvanic cells.
Figure 2A:
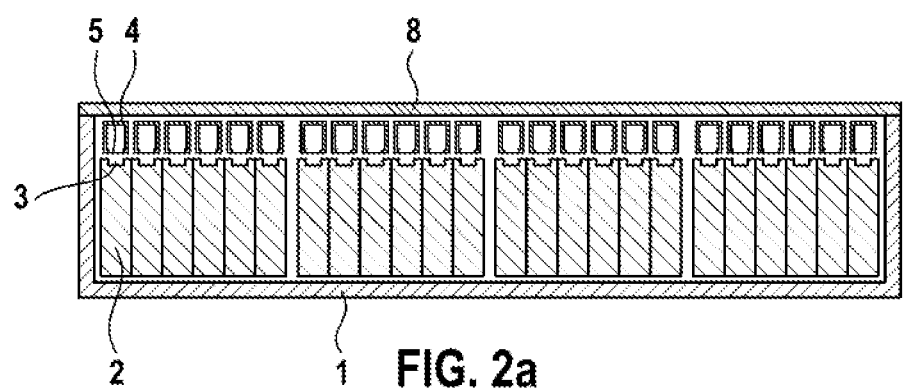
FIG. 2a shows a schematic cross section through a first refinement of the embodiment shown in FIG. 1, of a battery according to the disclosure perpendicular to the side faces of the galvanic cells, in which one dispenser is provided per cell.
Figure 2B:
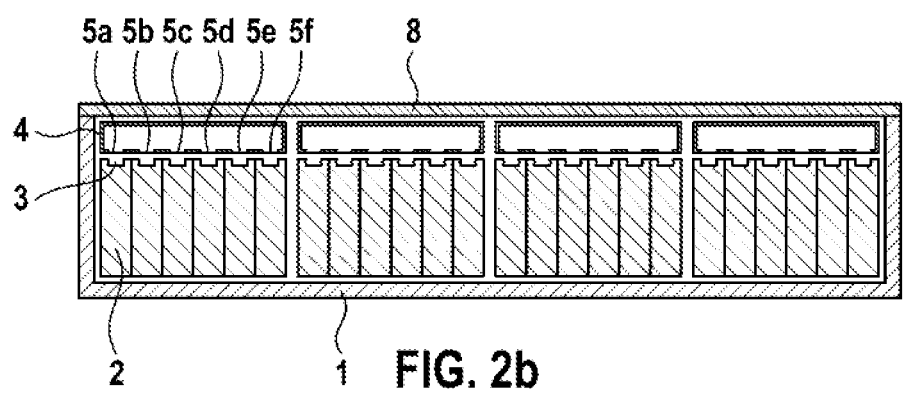
FIG. 2b shows a schematic cross section through a second refinement of the embodiment shown in FIG. 1, of a battery according to the disclosure perpendicular to the side faces of the galvanic cells, in which one dispenser is provided per module.

FIGS. 1, 2a and 2b show a battery housing 1, in the interior space of which sixteen modules composed of six galvanic cells 2, in particular lithium-ion cells, each, are arranged. The figures illustrate the fact that the cells 2 are each provided with a cut-out area 3 which can be opened in the event of failure of the cell 2. Within the scope of the embodiments shown, the cut-out areas 3 are formed in a section which is countersunk with respect to the main face of the upper side of the cell. The figures also show that the interior space of the battery housing 1 also has a dispenser 4 for dispensing a flame-inhibiting, flame-retarding and/or flame-extinguishing, liquid, solid or foam agent which have dispenser openings 5; 5a, 5b, 5c, 5d, 5e, 5f which are arranged adjacent to a cut-out area 3 of a cell 2 and can be opened.

According to the disclosure, these dispenser openings 5; 5a, 5b, 5c, 5d, 5e, 5f are configured to be capable of opening in the event of a mechanical shock and/or an increase in temperature and/or a pressure increase above a predetermined limiting value.

Within the scope of the embodiment shown, the dispenser openings 5; 5a, 5b, 5c, 5d, 5e, 5f are embodied in the form of thinning of the wall of the dispenser 4. In this context, the dispenser 4 can be formed, at least in the region of the dispenser opening 5; 5a, 5b, 5c, 5d, 5e, 5f, partially or completely from an organic, for example polymer and/or wax-like, or inorganic material, for example in the form of glass, in order to ensure the dispenser opening 5; 5a, 5b, 5c, 5d, 5e, 5f opens in the event of a mechanical shock and/or an increase in temperature and/or a pressure increase. Alternatively, the dispenser openings 5; 5a, 5b, 5c, 5d, 5e, 5f can have an opening mechanism, for example a valve, by means of which the dispenser opening 5; 5a, 5b, 5c, 5d, 5e, 5f can be opened automatically (not illustrated). Such an opening mechanism can open automatically, for example when an accident of a vehicle comprising the battery housing 1 is detected on the basis of crash sensor data, for example an acceleration sensor, of the vehicle.

Within the scope of the embodiments shown, each of the cells 2 have the cut-out areas 3 on the upper side of the cell, wherein in each case a dispenser opening 5; 5a, 5b, 5c, 5d, 5e, 5f is arranged over a cut-out area 3. When necessary, the flame-inhibiting, flame-retarding and/or flame-extinguishing agent can therefore be applied to the cut-out areas 3 from the dispenser 4, and collect in the depressions.

Within the scope of the embodiments shown, the dispensers 4 are each arranged between the poles 6, 7 of the galvanic cell 2.

FIG. 2a shows that in this context each cell 2 can have a dispenser 4, wherein in each case the dispenser opening 5 of a dispenser 4 is arranged over a cut-out area 3 of a cell 2.

FIG. 2b shows that it is, however, also possible for a dispenser 4 to be assigned to a plurality of cells 2, for example of a module, wherein the dispenser 4 which is assigned to the module can be arranged between the poles 6, 7 of the cells 2 of a module. FIG. 2b also illustrates that a dispenser 4 can have a plurality of dispenser openings 5a, 5b, 5c, 5d, 5e, 5f. FIG. 2b shows that in each case a dispenser opening 5a, 5b, 5c, 5d, 5e, 5f can be arranged here over a cut-out area 3 of a cell 2 of a module composed of a plurality of connected galvanic cells 2, in particular wherein the number of dispenser openings 5a, 5b, 5c, 5d, 5e, 5f of the dispenser 4 corresponds to the number of cells 2, in particular of the cut-out area 3, of the module.

Within the scope of the embodiments shown, the dispensers 4 advantageously do not take up any additional space apart from the space available between the poles 6, 7 of the cells 2.

FIGS. 1, 2a and 2b also illustrate the fact that the battery housing 1 can have a basic housing in which the interior space is formed for accommodating the galvanic cells 2, wherein the basic housing or the interior space of the basic housing can be closed off with a housing lid 8.

The invention claimed is:

1. A battery housing comprising:
an inner chamber configured to accommodate galvanic cells, each cell having at least one cut-out area configured to be opened in an event of failure of the cell,
wherein an interior of the battery housing includes at least one dispenser configured to dispense a flame-inhibiting, flame-retarding and/or flame-extinguishing agent, the at least one dispenser including a wall, the at least one dispenser arranged between poles of a single cell,
wherein the at least one dispenser includes at least one dispenser opening arranged adjacent to the at least one cut-out area of the single cell and configured to be opened,
wherein the at least one dispenser opening is configured to be opened in an event of a mechanical shock and/or an increase in temperature and/or a pressure increase above a predetermined limiting value,
wherein the at least one dispenser opening is a thinned portion of the wall of the at least one dispenser, and
wherein the at least one dispenser is configured to be arranged between the poles of the galvanic cell or of the module composed of a plurality of galvanic cells without taking up additional space apart from a space available between the poles of the cell or cells.

2. The battery housing as claimed in claim 1, wherein the at least one dispenser is configured to dispense one of a liquid, a foam, and a solid.

3. The battery housing as claimed in claim 1, wherein the at least one dispenser is formed, at least in a region of the at least one dispenser opening, at least partially from an organic material with a melting point in a range from ≥80° C. to ≤200° C.

4. The battery housing as claimed in claim 1, wherein the at least one dispenser is formed, at least in a region of the at least one dispenser opening, at least partially from a plastic.

5. The battery housing of claim 4, wherein the plastic a thermoplast.

6. The battery housing as claimed in claim 1, wherein the at least one dispenser opening includes an opening mechanism-configured to enable the at least one dispenser opening to be opened automatically.

7. The battery housing of claim 6, wherein the opening mechanism is configured to be opened based on crash sensor data when an accident of a vehicle comprising the battery housing is detected.

8. The battery housing as claimed in claim 1, wherein the at least one dispenser is a blow-molded body.

9. The battery housing as claimed in claim 1, wherein the at least one dispenser is formed at least partially from a glass, at least in a region of the at least one dispenser opening.

10. The battery housing as claimed in claim 1, wherein the at least one dispenser includes a plurality of dispenser openings.

11. The battery housing of claim 10, wherein a number of dispenser openings of a dispenser corresponds to a number of cells.

12. The battery housing as claimed in claim 1, wherein:
each cell has the cut-out area on a cell upper side, and
at least one dispenser opening is configured to be arranged above the cells.

13. The battery housing as claimed in claim 1, wherein the flame-inhibiting, flame-retarding and/or flame-extinguishing agent comprises at least one of at least one alkaline earth compound and at least one radical catcher.

14. The battery housing of claim 1, wherein the galvanic cells are lithium-ion cells.

15. The battery housing of claim 1, wherein the wall or a joint seam is one of a weld seam, flow line or joint.

* * * * *

UNITED STATES PATENT AND TRADEMARK OFFICE
CERTIFICATE OF CORRECTION

PATENT NO. : 9,806,325 B2
APPLICATION NO. : 14/115641
DATED : October 31, 2017
INVENTOR(S) : Woehrle et al.

Page 1 of 1

It is certified that error appears in the above-identified patent and that said Letters Patent is hereby corrected as shown below:

In the Claims

In Column 8, Lines 15-19, Claim 3 should read:
3. The battery housing as claimed in claim 1, wherein the at least one dispenser is formed, at least in a region of the at least one dispenser opening, at least partially from an organic material with a melting point in a range from $\geq 80°$ C to $\leq 200°$ C.

Signed and Sealed this
Twenty-seventh Day of March, 2018

Andrei Iancu
*Director of the United States Patent and Trademark Office*